US009426813B2

(12) United States Patent
Jung et al.

(10) Patent No.: US 9,426,813 B2
(45) Date of Patent: Aug. 23, 2016

(54) INTERFERENCE CANCELLATION RECEIVING METHOD AND INTERFERENCE CANCELLATION RECEIVING TERMINAL

(71) Applicant: LG ELECTRONICS INC., Seoul (KR)

(72) Inventors: Manyoung Jung, Seoul (KR); Sangwook Lee, Seoul (KR); Jinyup Hwang, Seoul (KR); Yoonoh Yang, Seoul (KR); Suhwan Lim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/440,320

(22) PCT Filed: Nov. 1, 2013

(86) PCT No.: PCT/KR2013/009823
§ 371 (c)(1),
(2) Date: May 1, 2015

(87) PCT Pub. No.: WO2014/069929
PCT Pub. Date: May 8, 2014

(65) Prior Publication Data
US 2015/0282190 A1    Oct. 1, 2015

Related U.S. Application Data

(60) Provisional application No. 61/721,500, filed on Nov. 2, 2012.

(51) Int. Cl.
*H04W 4/00* (2009.01)
*H04J 4/00* (2006.01)
*H04B 14/04* (2006.01)
*H04L 27/10* (2006.01)
*H04B 15/00* (2006.01)
*H04L 25/03* (2006.01)
(Continued)

(52) U.S. Cl.
CPC ............. *H04W 72/082* (2013.01); *H04B 17/00* (2013.01); *H04B 17/345* (2015.01); *H04J 11/004* (2013.01); *H04J 11/005* (2013.01); *H04W 76/046* (2013.01); *H04L 2025/03605* (2013.01)

(58) Field of Classification Search
CPC ...... H04J 11/00; H04J 11/0023; H04J 11/004; H04J 11/005; H04B 7/0626; H04B 7/26; H04B 17/00; H04B 17/345; H04W 72/082; H04W 76/046; H04L 5/0005; H04L 5/0073; H04L 2025/03605
USPC .................. 370/310–350, 436, 441–443, 468, 370/478–485, 498, 508; 375/144, 148, 227, 375/254, 278, 284–285, 296, 346–348
See application file for complete search history.

(56) References Cited

U.S. PATENT DOCUMENTS

| 8,605,838 B2* | 12/2013 | Molnar | H04J 11/0023 375/260 |
| 2009/0010228 A1* | 1/2009 | Wang | H04B 1/7105 370/335 |

(Continued)

FOREIGN PATENT DOCUMENTS

| WO | WO 2012/035453 A1 | 3/2012 |
| WO | WO 2012/059139 A1 | 5/2012 |

OTHER PUBLICATIONS

Ericsson, ST-Ericsson, "On the Accuracy of CSI-RSRP Measurements", 3GPP TSG-RAN WG1 #70, Qingdao, China, Aug. 13-17, 2012, R1-123849.

(Continued)

*Primary Examiner* — Tri H Phan
(74) *Attorney, Agent, or Firm* — Birch, Stewart, Kolasch & Birch, LLP

(57) ABSTRACT

One embodiment of the present specification provides an interference cancellation receiving method. According to the method, interference estimation support information can be received from a serving cell. The information includes information for a time domain and information for a frequency domain, wherein the information for a time domain can indicate a section of a subframe or a radio frame in which the coherence of an interference signal is maintained, and the information for a frequency domain can indicate a section in which the coherence of the interference signal is maintained. According to the method, an interference signal introduced from a neighboring cell is estimated by using the information for a time domain and the information for a frequency domain of the interference estimation support information, and a signal from the serving cell can be detected by cancelling the estimated interference.

12 Claims, 13 Drawing Sheets

(51) Int. Cl.
*H04W 72/08* (2009.01)
*H04J 11/00* (2006.01)
*H04W 76/04* (2009.01)
*H04B 17/00* (2015.01)
*H04B 17/345* (2015.01)

(56) References Cited

U.S. PATENT DOCUMENTS

2011/0021153 A1 1/2011 Safavi
2014/0219237 A1* 8/2014 Charbit ............... H04W 72/044
370/330
2014/0341048 A1* 11/2014 Sajadieh ............... H04L 5/0085
370/252
2015/0103802 A1* 4/2015 Cheng ................... H04L 5/0048
370/330
2015/0117391 A1* 4/2015 Rusek ............... H04L 25/03171
370/330

OTHER PUBLICATIONS

Qualcomm Incorporated, "Details of restricted CSI measurements", 3GPP TSG-RAN WG1 #63, Nov. 15-Nov. 19, 2010, Jacksonville, USA, R1-106380, pp. 1-4.

* cited by examiner

FIG. 6
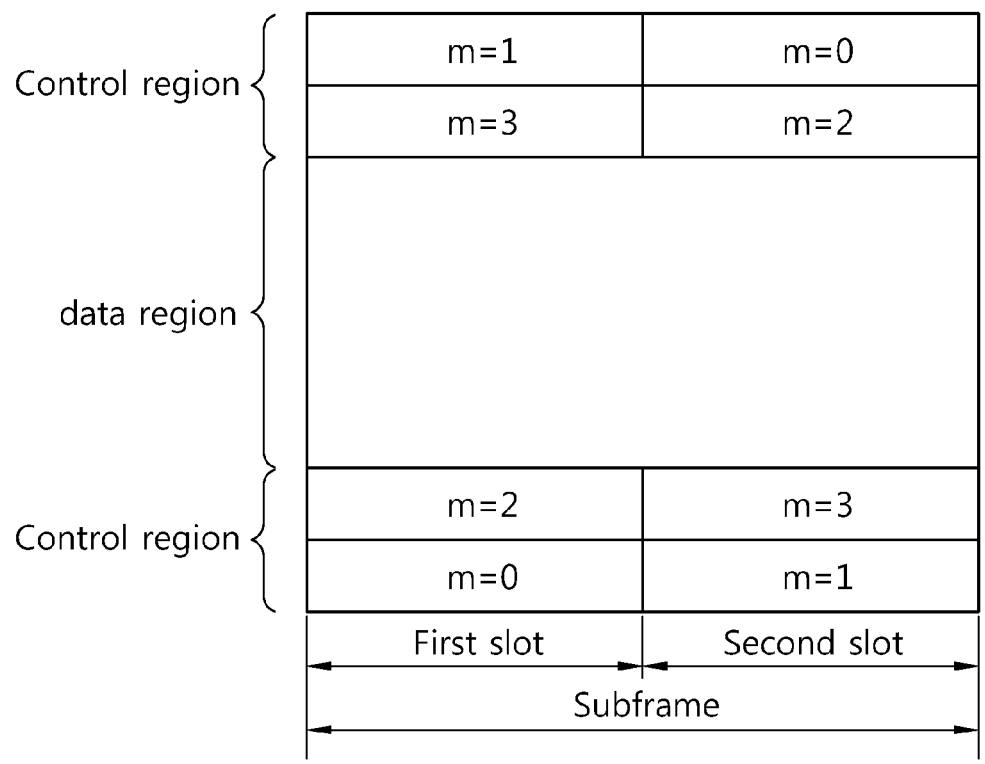
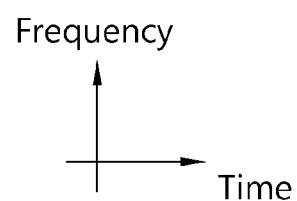

INTERFERENCE CANCELLATION RECEIVING METHOD AND INTERFERENCE CANCELLATION RECEIVING TERMINAL

CROSS REFERENCE TO RELATED APPLICATIONS

This application is the National Phase of PCT/KR2013/009823 filed on Nov. 1, 2013, which claims priority under 35 U.S.C. 119(e) to U.S. Provisional Application No. 61/721,500 filed on Nov. 2, 2012, all of which are hereby expressly incorporated by reference into the present application.

BACKGROUND OF THE INVENTION

1. Field of the Invention

The present specification relates to an interference cancellation receiving method and an interference cancellation receiving terminal.

2. Related Art

3GPP (3rd Generation Partnership Project) LTE (Long Term Evolution) that is an advancement of UMTS (Universal Mobile Telecommunication System) is being introduced with 3GPP release 8. In 3GPP LTE, OFDMA (orthogonal frequency division multiple access) is used for downlink, and SC-FDMA (single carrier-frequency division multiple access) is used for uplink. To understand OFDMA, OFDM should be known. OFDM may attenuate inter-symbol interference with low complexity and is in use. OFDM converts data serially input into N parallel data pieces and carries the data pieces over N orthogonal sub-carriers. The sub-carriers maintain orthogonality in view of frequency. Meanwhile, OFDMA refers to a multiple access scheme that realizes multiple access by independently providing each user with some of sub-carriers available in the system that adopts OFDM as its modulation scheme.

Recently, 3GPP LTE-Advanced (LTE-A) which is an evolution of 3GPP LTE has been discussed.

In addition, a heterogeneous network in which a macro cell and a small-scale cell coexist has been discussed recently. Particularly, discussions have been progressed in order to detour traffic by dispersing terminals connected to a macro cell into a small-scale cell.

Meanwhile, small-scale cells may cause further increase in interference, and accordingly an interference cancellation function is urgently needed.

SUMMARY OF THE INVENTION

An aspect of the present specification is to provide a method and a terminal for efficiently cancelling interference.

To achieve the foregoing purposes, an aspect of the present specification provides an interference cancellation receiving method. The method may comprise: receiving interference estimation assistance information from a serving cell, the interference estimation assistance information including information for a time domain and information for a frequency domain, the information for the time domain indicating a period of a radio frame or subframe in the time domain in which coherence of an interference signal is maintained, and the information for the frequency domain indicating a period in the frequency domain in which the coherence of the interference signal is maintained; estimating an interference signal introduced from a neighbor cell using the information for the time domain and the information for the frequency domain of the interference estimation support information; and detecting a signal from the serving cell by cancelling the estimated interference signal.

To achieve the foregoing purposes, another aspect of the present specification provides a terminal of a wireless communication system. The terminal may comprise: a wireless reception unit; an interference estimation unit to control the wireless reception unit and to estimate an interference signal introduced from a neighbor cell using interference estimation assistance information received from a serving cell, the interference estimation assistance information comprising information for a time domain and information for a frequency domain, the information for the time domain indicating a period of a radio frame or subframe in the time domain in which coherence of an interference signal is maintained, and the information for the frequency domain indicating a period in the frequency domain in which the coherence of the interference signal is maintained; and an interference cancellation unit to detect a signal from the serving cell by cancelling the estimated interference signal.

The interference estimation assistance information may be generated by information acquired by the serving cell from the neighbor cell.

The information for the time domain may be expressed as an integer multiple of 10 ms which is length of the radio frame.

The period in the frequency domain indicated by the information for the frequency domain may be expressed as number of resource blocks (RBs).

The number of RBs indicated by the information for the frequency domain may be one of 1, 2, 4 and 8.

The information for the frequency domain may be expressed as a two-bit value, a two-bit value of 00 represents 1, a two-bit value of 01 represents 2, a two-bit value of 10 represents 4, and a two-bit value of 11 represents 8.

The interference estimation assistance information may be received through a broadcast channel or RRC signaling.

Advantageous Effects

According to an aspect of the present specification, reception performance may be further enhanced through an interference cancellation function.

BRIEF DESCRIPTION OF THE DRAWINGS

FIG. 6 illustrates the architecture of an uplink subframe in 3GPP LTE.

DESCRIPTION OF EXEMPLARY EMBODIMENTS

Figure 1:
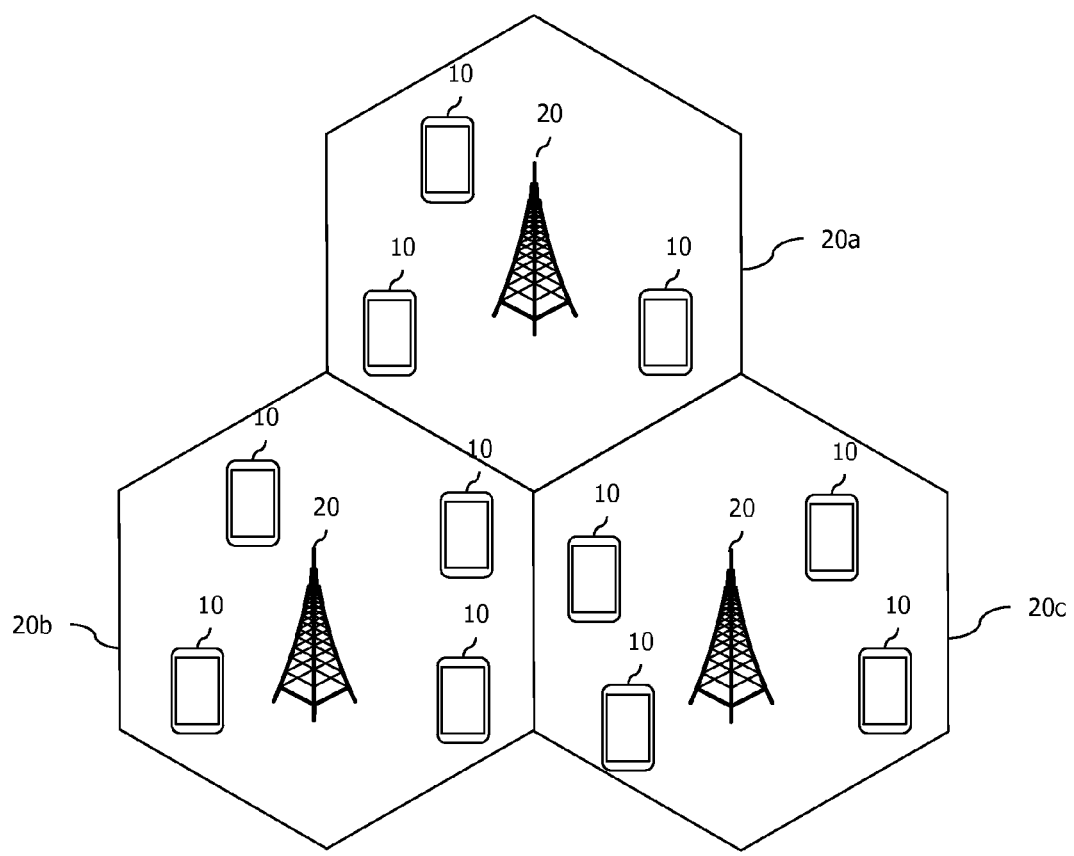
FIG. 1 shows a wireless communication system.

The technical terms used herein are used to merely describe specific embodiments and should not be construed as limiting the present invention. Further, the technical terms used herein should be, unless defined otherwise, interpreted as having meanings generally understood by those skilled in the art but not too broadly or too narrowly. Further, the technical terms used herein, which are determined not to exactly represent the spirit of the invention, should be replaced by or understood by such technical terms as being able to be exactly understood by those skilled in the art. Further, the general terms used herein should be interpreted in the context as defined in the dictionary, but not in an excessively narrowed manner.

The expression of the singular number in the specification includes the meaning of the plural number unless the meaning of the singular number is definitely different from that of the plural number in the context. In the following description, the term "include" or "have" may represent the existence of a feature, a number, a step, an operation, a component, a part or the combination thereof described in the specification, and may not exclude the existence or addition of another feature, another number, another step, another operation, another component, another part or the combination thereof.

The terms "first" and "second" are used for the purpose of explanation about various components, and the components are not limited to the terms 'first' and 'second'. The terms "first" and "second" are only used to distinguish one component from another component. For example, a first component may be named as a second component without deviating from the scope of the present invention.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present invention will be described in greater detail with reference to the accompanying drawings. In describing the present invention, for ease of understanding, the same reference numerals are used to denote the same components throughout the drawings, and repetitive description on the same components will be omitted. Detailed description on well-known arts which are determined to make the gist of the invention unclear will be omitted. The accompanying drawings are provided to merely make the spirit of the invention readily understood, but not should be intended to be limiting of the invention. It should be understood that the spirit of the invention may be expanded to its modifications, replacements or equivalents in addition to what is shown in the drawings.

As used herein, "wireless device" may be stationary or mobile, and may be denoted by other terms such as terminal, MT (mobile terminal), UE (user equipment), ME (mobile equipment), MS (mobile station), UT (user terminal), SS (subscriber station), handheld device, or AT (access terminal).

As used herein, "base station" generally refers to a fixed station that communicates with a wireless device and may be denoted by other terms such as eNB (evolved-NodeB), BTS (base transceiver system), or access point.

Hereinafter, applications of the present invention based on 3GPP (3rd generation partnership project) LTE (long term evolution) or 3GPP LTE-A (advanced) are described. However, this is merely an example, and the present invention may apply to various wireless communication systems. Hereinafter, LTE includes LTE and/or LTE-A.

FIG. 1 shows a wireless communication system.

As can be seen from FIG. 1, the wireless communication system includes at least one base station (BS) 20. Each base station 20 offers a communication service in a specific geographical area (generally denoted cell) 20a, 20b, and 20c. Each cell may be divided into a plurality of areas (which are called sectors). A user equipment (UE) 10 may be fixed or mobile and may be referred to by other names such as mobile station (MS), mobile user equipment (MT), user user equipment (UT), subscriber station (SS), wireless device, personal digital assistant (PDA), wireless modem, handheld device. The BS 20 generally refers to a fixed station that communicates with the UE 10 and may be called by other names such as evolved-NodeB (eNB), base transceiver system (BTS), access point (AP), etc.

The terminal generally belongs to one cell and the cell to which the terminal belong is referred to as a serving cell. A base station that provides the communication service to the serving cell is referred to as a serving BS. Since the wireless communication system is a cellular system, another cell that neighbors to the serving cell is present. Another cell which neighbors to the serving cell is referred to a neighbor cell. A base station that provides the communication service to the neighbor cell is referred to as a neighbor BS. The serving cell and the neighbor cell are relatively decided based on the terminal.

Hereinafter, a downlink means communication from the base station 20 to the terminal 10 and an uplink means communication from the terminal 10 to the base station 20. In the downlink, a transmitter may be a part of the base station 20 and a receiver may be a part of the terminal 10. In the uplink, the transmitter may be a part of the terminal 10 and the receiver may be a part of the base station 20.

Meanwhile, the wireless communication system may be any one of a multiple-input multiple-output (MIMO) system, a multiple-input single-output (MISO) system, a single-input single-output (SISO) system, and a single-input multiple-output (SIMO) system. The MIMO system uses a plurality of transmit antennas and a plurality of receive antennas. The MISO system uses a plurality of transmit antennas and one receive antenna. The SISO system uses one transmit antenna and one receive antenna. The SIMO system uses one transmit antenna and one receive antenna. Hereinafter, the transmit antenna means a physical or logical antenna used to transmit one signal or stream and the receive antenna means a physical or logical antenna used to receive one signal or stream.

Figure 2:
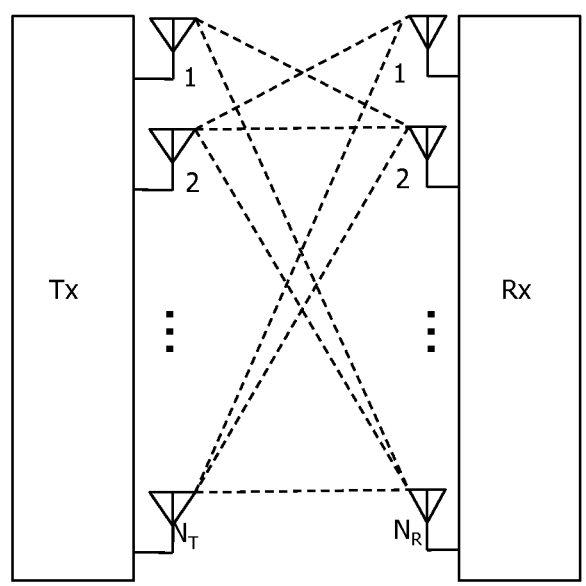
FIG. 2 illustrates a general multiple antenna system.

FIG. 2 illustrates a general multiple antenna system.

As shown in FIG. 2, when increasing the number of transmission antenna to and increasing the number of reception antenna to at the same time, a transmission rate can be increased and a frequency efficiency can be dramatically increased because a theoretical channel transmission capacity is increased in proportion to the number of antenna, unlike the case of using multiple antennas only in either one of transmitter or receiver.

The transmission rate due to the increase of channel transmission capacity may be theoretically increased by multiple of a maximum transmission rate in case of using an antenna and a rate increase as shown below. That is, for example, in the MIMO communication system that uses 4 transmission antennas and 4 reception antennas, the transmission rate may be increased 4 times in comparison with the single antenna system theoretically.

After the theoretical increase of capacity in such a multiple antenna system is proved in the mid-1990's, various technologies to induce the theoretical increase into actual increase of data transmission rate has been researched up to now, and a few of the technologies are already applied to various wireless communication standards such as third generation mobile communication and next generation wireless LAN, etc.

$$R_i = \min(N_T, N_R) \quad \text{[Equation 1]}$$

The research trends in relation to the multiple antenna up to now show that researches have been vigorously progressed in various aspects such as a research in the aspect of information theory in relation to communication capacity calculation of multiple antenna in various channel environment and multiple access environment, researches of wireless channel measurement and modeling process of the multiple antenna system, and a research of space-time signal processing for increasing transmission reliability and transmission rate, etc.

In a user equipment structure having general MIMO channel environment, reception signals received in each reception antenna can be expressed as follows.

$$y = \begin{bmatrix} y_1 \\ y_2 \\ \vdots \\ y_i \\ \vdots \\ y_{N_R} \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & \ddots & \\ h_{N_R 1} & h_{N_R 2} & \cdots & h_{N_R N_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix} = \quad \text{[Equation 2]}$$

$$Hx + n$$

Herein, the channel between respective transmission and reception antennas may be distinguished based on transmission and reception index, and the channel passing from a transmission antenna to a reception antenna is represented as. In case of using precoding scheme like LTE when transmitting a signal, the transmission signal x can be expressed by Equation 3.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \\ w_{i1} & w_{i2} & \cdots & w_{iN_T} \\ \vdots & & \ddots & \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = \quad \text{[Equation 3]}$$

$$W\hat{s} = WPs$$

Herein, $w_{ij}$, a precoding matrix w means a weighting between a $i^{th}$ transmission antenna and $j^{th}$ information. In this time, if the transmission power of a respective signal to be transmitted is $P_1, P_2, \ldots, P_{NT}$, a transmission information of which transmission power has been adjusted may be represented as a diagonal matrix P as follows.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

Meanwhile, a wireless communication system may be divided into a frequency division duplex (FDD) method and a time division duplex (TDD) method. Based on the FDD method, an uplink transmission and a downlink transmission are progressed in different frequency bands. Based on the TDD method, the uplink transmission and the downlink transmission are performed in the same frequency band at different times. A channel response of a TDD method is actually reciprocal. This means the downlink channel response and the uplink channel response are almost same in the current frequency domain. Therefore, there is an advantage in that the downlink channel response in the wireless communication system based on the TDD may be obtained from the uplink channel response. In the TDD method, as the whole frequency domain is divided into an uplink transmission and a downlink transmission by time-share, it is not available to perform the downlink transmission by a terminal and the uplink transmission by a UE at the same time. In the TDD system in which an uplink transmission and a downlink transmission are divided by a subframe unit, the uplink transmission and the downlink transmission are performed in different subframes.

Hereinafter, the LTE system is described in further detail.

Figure 3:
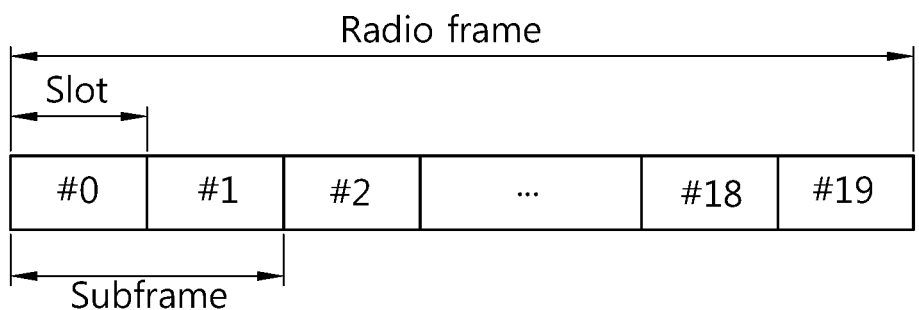
FIG. 3 illustrates the architecture of a radio frame according to FDD in 3GPP LTE.

FIG. 3 illustrates the architecture of a radio frame according to FDD in 3GPP LTE.

Referring to FIG. 3, the radio frame is composed of ten subframes, and one subframe is composed of two slots. The slots in the radio frame are designated by slot numbers from 0 to 19. The time at which one subframe is transmitted is referred to as a transmission time interval (TTI). The TTI may be called as a scheduling unit for data transmission. For example, the length of one radio frame may be 10 ms, the length of one subframe may be 1 ms, and the length of one slot may be 0.5 ms.

The structure of the radio frame is merely an example, and the number of subframes included in the radio frame, the number of slots included in the subframe, etc. may be variously modified.

Figure 4:
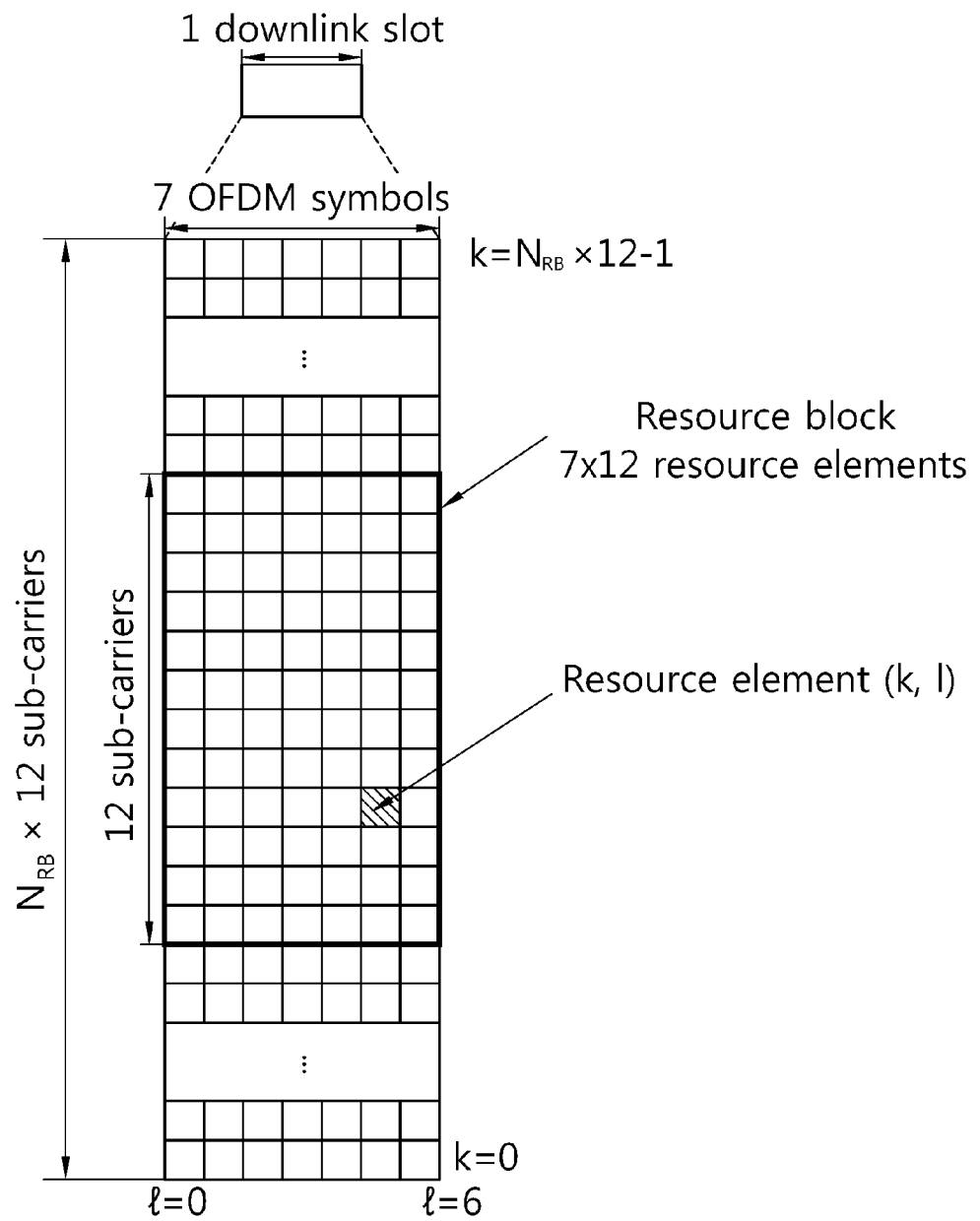
FIG. 4 illustrates a resource grid for a single uplink or downlink slot in 3GPP LTE.

FIG. 4 illustrates an example resource grid for one uplink or downlink slot in 3GPP LTE.

Referring to FIG. 4, the uplink slot includes a plurality of OFDM (orthogonal frequency division multiplexing) symbols in the time domain and NUL resource blocks (RBs) in the frequency domain. OFDM symbol is to represent one symbol period, and depending on system, may also be denoted SC-FDMA symbol, OFDM symbol, or symbol period. The resource block is a unit of resource allocation and includes a plurality of sub-carriers in the frequency domain. The number of resource blocks included in the uplink slot, i.e., NUL, is dependent upon an uplink transmission bandwidth set in a cell. Each element on the resource grid is denoted resource element.

Here, by way of example, one resource block includes 7×12 resource elements that consist of seven OFDM symbols in the time domain and 12 sub-carriers in the frequency domain. However, the number of sub-carriers in the resource block and the number of OFDM symbols are not limited thereto. The number of OFDM symbols in the resource block or the number of sub-carriers may be changed variously. In other words, the number of OFDM symbols may be varied depending on the above-described length of CP. In particular, 3GPP LTE defines one slot as having seven OFDM symbols in the case of CP and six OFDM symbols in the case of extended CP.

In 3GPP LTE, the resource grid for one uplink slot shown in FIG. 4 may also apply to the resource grid for the downlink slot.

Figure 5:
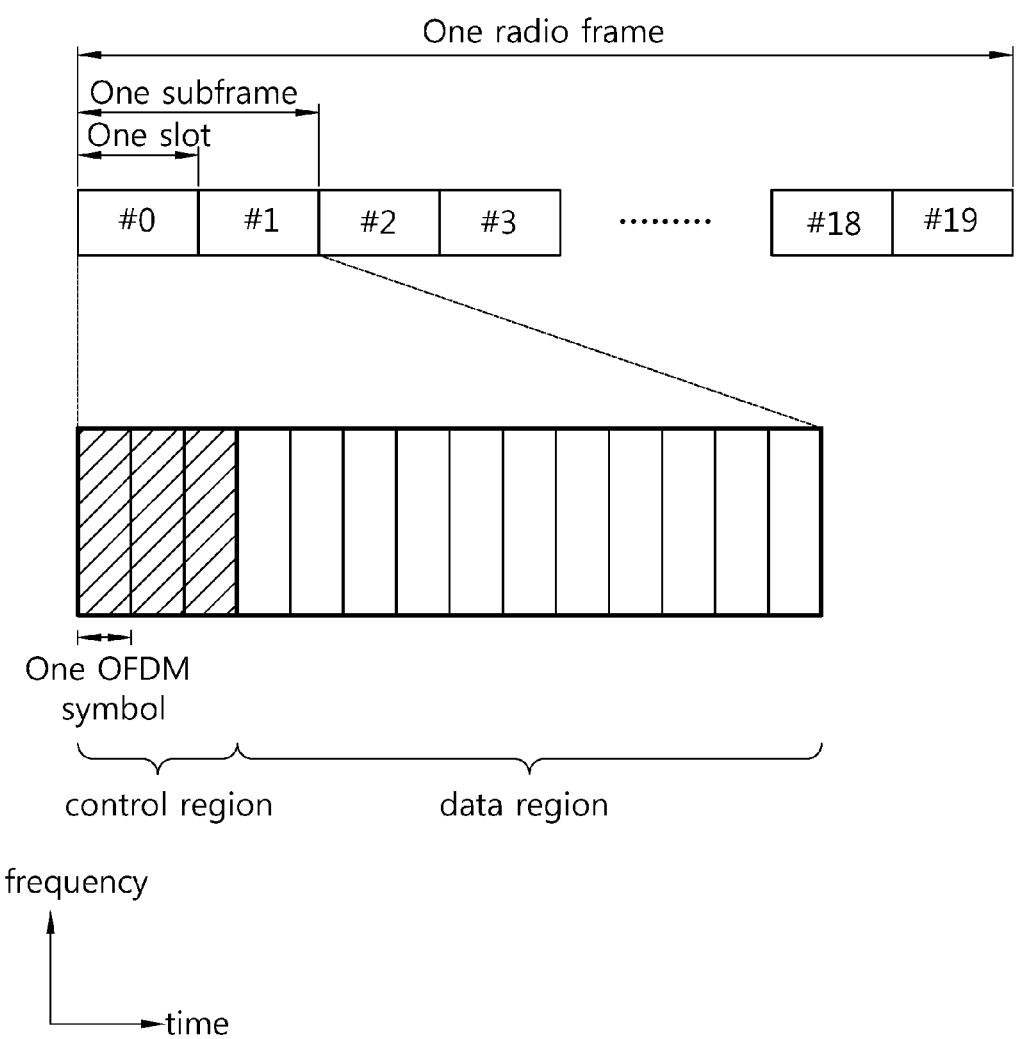
FIG. 5 illustrates the architecture of a downlink subframe.

FIG. 5 illustrates the architecture of a downlink subframe. For this, 3GPP TS 36.211 V10.4.0 (2011-12) "Evolved Universal Terrestrial Radio Access (E-UTRA); Physical Channels and Modulation (Release 10)", Ch. 4 may be referenced.

The radio frame includes 10 subframes indexed 0 to 9. One subframe includes two consecutive slots. Accordingly, the radio frame includes 20 slots. The time taken for one subframe to be transmitted is denoted TTI (transmission time interval). For example, the length of one subframe may be 1 ms, and the length of one slot may be 0.5 ms.

One slot may include a plurality of OFDM (orthogonal frequency division multiplexing) symbols in the time domain. OFDM symbol is merely to represent one symbol period in the time domain since 3GPP LTE adopts OFDMA (orthogonal frequency division multiple access) for downlink (DL), and the multiple access scheme or name is not limited thereto. For example, the OFDM symbol may be referred to as SC-FDMA (single carrier-frequency division multiple access) symbol or symbol period.

Here, one slot includes seven OFDM symbols, by way of example. However, the number of OFDM symbols included in one slot may vary depending on the length of CP (cyclic prefix). That is, as described above, according to 3GPP TS 36.211 V10.4.0, one slot includes seven OFDM symbols in the normal CP and six OFDM symbols in the extended CP.

Resource block (RB) is a unit for resource allocation and includes a plurality of sub-carriers in one slot. For example, if one slot includes seven OFDM symbols in the time domain and the resource block includes 12 sub-carriers in the frequency domain, one resource block may include 7×12 resource elements (REs).

The DL (downlink) subframe is split into a control region and a data region in the time domain. The control region includes up to first three OFDM symbols in the first slot of the subframe. However, the number of OFDM symbols included in the control region may be changed. A PDCCH (physical downlink control channel) and other control channels are assigned to the control region, and a PDSCH is assigned to the data region.

As set forth in 3GPP TS 36.211 V10.4.0, the physical channels in 3GPP LTE may be classified into data channels such as PDSCH (physical downlink shared channel) and PUSCH (physical uplink shared channel) and control channels such as PDCCH (physical downlink control channel), PCFICH (physical control format indicator channel), PHICH (physical hybrid-ARQ indicator channel) and PUCCH (physical uplink control channel).

The PCFICH transmitted in the first OFDM symbol of the subframe carries CIF (control format indicator) regarding the number (i.e., size of the control region) of OFDM symbols used for transmission of control channels in the subframe. The wireless device first receives the CIF on the PCFICH and then monitors the PDCCH.

Unlike the PDCCH, the PCFICH is transmitted through a fixed PCFICH resource in the subframe without using blind decoding.

The PHICH carries an ACK (positive-acknowledgement)/NACK (negative-acknowledgement) signal for a UL HARQ (hybrid automatic repeat request). The ACK/NACK signal for UL (uplink) data on the PUSCH transmitted by the wireless device is sent on the PHICH.

The PBCH (physical broadcast channel) is transmitted in the first four OFDM symbols in the second slot of the first subframe of the radio frame. The PBCH carries system information necessary for the wireless device to communicate with the base station, and the system information transmitted through the PBCH is denoted MIB (master information block). In comparison, system information transmitted on the PDSCH indicated by the PDCCH is denoted SIB (system information block).

The control information transmitted through the PDCCH is denoted downlink control information (DCI). The DCI may include resource allocation of PDSCH (this is also referred to as DL (downlink) grant), resource allocation of PUSCH (this is also referred to as UL (uplink) grant), a set of transmission power control commands for individual UEs in some UE group, and/or activation of VoIP (Voice over Internet Protocol).

In 3GPP LTE, blind decoding is used for detecting a PDCCH. The blind decoding is a scheme of identifying whether a PDCCH is its own control channel by demasking a desired identifier to the CRC (cyclic redundancy check) of a received PDCCH (this is referred to as candidate PDCCH) and checking a CRC error. The base station determines a PDCCH format according to the DCI to be sent to the wireless device, then adds a CRC to the DCI, and masks a unique identifier (this is referred to as RNTI (radio network temporary identifier) to the CRC depending on the owner or purpose of the PDCCH.

According to 3GPP TS 36.211 V10.4.0, the uplink channels include a PUSCH, a PUCCH, an SRS (Sounding Reference Signal), and a PRACH (physical random access channel).

FIG. 6 illustrates the architecture of an uplink subframe in 3GPP LTE.

Referring to FIG. 6, the uplink subframe may be separated into a control region and a data region in the frequency domain. The control region is assigned a PUCCH (physical uplink control channel) for transmission of uplink control information. The data region is assigned a PUSCH (physical uplink shared channel) for transmission of data (in some cases, control information may also be transmitted).

The PUCCH for one terminal is assigned in resource block (RB) pair in the subframe. The resource blocks in the resource block pair take up different sub-carriers in each of the first and second slots. The frequency occupied by the resource blocks in the resource block pair assigned to the PUCCH is varied with respect to a slot boundary. This is referred to as the RB pair assigned to the PUCCH having been frequency-hopped at the slot boundary. The terminal may obtain a frequency diversity gain by transmitting uplink control information through different sub-carriers over time.

Figure 7:
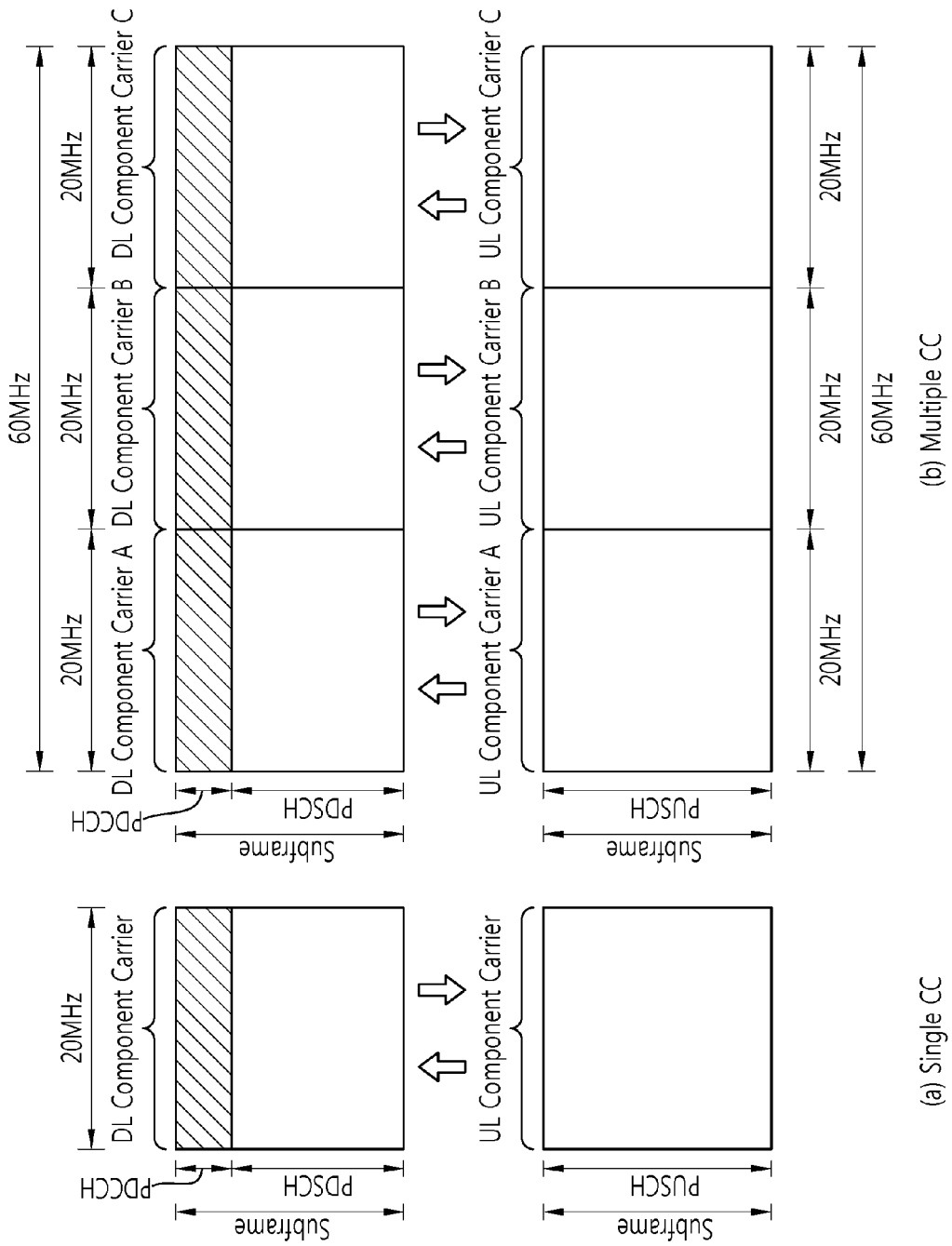
FIG. 7 illustrates an example of comparison between a single carrier system and a carrier aggregation system.

FIG. 7 illustrates an example of comparison between a single carrier system and a carrier aggregation system.

Referring to FIG. 7(a), a typical FDD wireless communication system supports one carrier for uplink and downlink. In this case, the carrier may have various bandwidths, but only one carrier is assigned to the user equipment.

In other words, in the typical FDD wireless communication system, data transmission and reception is carried out through one downlink band and one uplink band corresponding thereto. The base station and the user equipment transmit and receive control information and/or data scheduled for each subframe. The data is transmitted/received through the data region configured in the uplink/downlink subframe, and the control information is transmitted/received through the control region configured in the uplink/downlink subframe. For this, the uplink/downlink subframe carries signals through various physical channels. Although the description in connection with FIG. 7 primarily focuses on the FDD scheme for ease of description, the foregoing may be applicable to the TDD scheme by separating the radio frame for uplink/downlink in the time domain.

As shown in FIG. 7(a), data transmission/reception performed through one downlink band and one uplink band corresponding to the downlink band is referred to as a single carrier system.

Such single carrier system may correspond to an example of communication in the LTE system. Such 3GPP LTE system may have an uplink bandwidth and a downlink bandwidth that differ from each other, but supports up to 20 MHz.

Meanwhile, a high data transmission rate is demanded. The most fundamental and stable solution to this is to increase bandwidth.

However, the frequency resources are presently saturated, and various technologies are partially being in use in a wide range of frequency band. For such reason, as a method for securing a broad bandwidth to satisfy the demand for higher data transmission rate, each scattered band may be designed to meet basic requirements for being able to operate an independent system, and carrier aggregation (CA) whose concept is to bundle up multiple bands to a single system has been introduced.

That is, the carrier aggregation (CA) system means a system that constitutes a broadband by gathering one or more carriers each of which has a bandwidth narrower than the targeted broadband when supporting a broadband in the wireless communication system.

Such carrier aggregation (CA) technology is also adopted in the LTE-advanced (hereinafter, 'LTE-A'). The carrier aggregation (CA) system may also be referred to as a multiple-carrier system or bandwidth aggregation system.

In the carrier aggregation (CA) system, a user equipment may simultaneously transmit or receive one or more carriers depending on its capabilities. That is, in the carrier aggregation (CA) system, a plurality of component carriers (CCs) may be assigned to a user equipment. As used herein, the term "component carrier" refers to a carrier used in a carrier aggregation system and may be abbreviated to a carrier. Further, the term "component carrier" may mean a frequency block for carrier aggregation or a center frequency of a frequency block in the context and they may be interchangeably used.

FIG. 7(b) may correspond to a communication example in an LTE-A system.

Referring to FIG. 7(b), in case, e.g., three 20 MHz component carriers are assigned to each of uplink and downlink, the user equipment may be supported with a 60 MHz bandwidth. Or, for example, if five CCs are assigned as granularity of the unit of carrier having a 20 MHz bandwidth, up to 100 MHz may be supported. FIG. 7(b) illustrates an example in which the bandwidth of an uplink component carrier is the same as the bandwidth of a downlink component carrier for ease of description. However, the bandwidth of each component carrier may be determined independently. When aggregating one or more component carriers, a targeted component carrier may utilize the bandwidth used in the existing system for backward compatibility with the existing system. For example, in a 3GPP LTE system, bandwidths of 1.4 MHz, 3 MHz, 5 MHz, 10 MHz, 15 MHz and 20 MHz may be supported. Accordingly, the bandwidth of an uplink component carrier may be constituted like 5 MHz(UL CC0)+20 MHz (UL CC1)+20 MHz(UL CC2)+20 MHz(UL CC3)+5 MHz (UL CC4), for example. However, without consideration of backward compatibility, a new bandwidth may be defined rather the existing system bandwidth being used, to constitute a broadband.

FIG. 7(b) illustrates an example in which the number of uplink component carriers is symmetric with the number of downlink component carriers for ease of description. As such, when the number of uplink component carriers is the same as the number of downlink component carriers is denoted symmetric aggregation, and when the number of uplink component carriers is different from the number of downlink component carriers is denoted asymmetric aggregation.

The asymmetric carrier aggregation may occur due to a restriction on available frequency bands or may be artificially created by a network configuration. As an example, even when the entire system band comprises N CCs, the frequency band where a particular user equipment may perform reception may be limited to M (<N) CCs. Various parameters for carrier aggregation may be configured cell-specifically, UE group-specifically, or UE-specifically.

Meanwhile, carrier aggregation systems may be classified into contiguous carrier aggregation systems where each carrier is contiguous with another and non-contiguous carrier aggregation systems where each carrier is spaced apart from another. A guard band may be present between the carriers in the contiguous carrier aggregation system. Hereinafter, simply referring to a multi-carrier system or carrier aggregation system should be understood as including both when component carriers are contiguous and when component carriers are non-contiguous.

Meanwhile, the concept of cell as conventionally appreciated is varied by the carrier aggregation technology. In other words, according to the carrier aggregation technology, the term "cell" may mean a pair of a downlink frequency resource and an uplink frequency resource. Or, the cell may mean a combination of one downlink frequency resource and an optional uplink frequency resource.

In other words, according to the carrier aggregation technology, one DL CC or a pair of UL CC and DL CC may correspond to one cell. Or, one cell basically includes one DL CC and optionally includes a UL CC. Accordingly, a user equipment communicating with a bit stream through a plurality of DL CCs may be said to receive services from a plurality of serving cells. In this case, although downlink is constituted of a plurality of DL CCs, uplink may be used by only one CC. In such case, the user equipment may be said to receive services from a plurality of serving cells for downlink and to receive a service from only one serving cell for uplink.

Meanwhile, in order for packet data to be transmitted/received through a cell, configuration for a particular cell should be completed. Here, the term "configuration" means the state where system information necessary for data transmission/reception on a corresponding cell is completely received. For example, the configuration may include the overall process of receiving common physical layer parameters necessary for data transmission/reception, MAC (media access control) layer parameters, or parameters necessary for a particular operation in RRC layer. The configuration-completed cell is in the state where packet transmission/reception is possible simply when information indicating that packet data may be transmitted is received.

The configuration-completed cell may be left in activation or deactivation state. Here, the term "activation" refers to data transmission or reception being performed or being ready. The UE may monitor or receive a control channel (PDCCH)

or data channel (PDSCH) of an activated cell in order to identify resources (which may be frequency or time) assigned thereto.

Transmission or reception with a deactivated cell is impossible, while measurement or transmission/reception of least information is possible. The user equipment may receive system information (SI) necessary for receiving packets from a deactivated cell. In contrast, the user equipment does not monitor or receive the control channel (PDCCH) and data channel (PDSCH) of deactivated cells to identify resources (which may be frequency or time) assigned thereto.

In accordance with carrier aggregation technology, thus, activation/deactivation of a component carrier may be the same in concept as activation/deactivation of a serving cell. For example, assuming that serving cell 1 comprises DL CC1, activation of serving cell 1 means activation of DL CC1. Assuming that serving cell 2 is configured so that DL CC2 is connected with UL CC2, activation of serving cell 2 means activation of DL CC2 and UL CC2. In that regard, each component carrier may correspond to a serving cell.

On the other hand, a change in the concept of serving cell as conventionally understood by the carrier aggregation technology leads to primary cells and secondary cells being separated from each other.

The primary cell refers to a cell operating in a primary frequency and means a cell where the user equipment performs an initial connection establishment procedure or connection re-establishment procedure with a bit stream or a cell designated so during the course of handover.

The secondary cell means a cell operating in a secondary frequency, and is configured once an RRC connection is established and is used to provide additional radio resources.

The PCC (primary component carrier) means a component carrier (CC) corresponding to the primary cell. The PCC means a CC where the user equipment initially achieves connection (or RRC connection) with the base station among various CCs. The PCC is a special CC that is in charge of connection (or RRC connection) for signaling regarding multiple CCs and that manages UE context that is connection information relating to the UE. Further, the PCC, in case the PCC achieves connection with the UE so that it is in RRC connected mode, always remains in activated state. The downlink component carrier corresponding to the primary cell is referred to as a downlink primary component carrier (DL PCC), and the uplink component carrier corresponding to the primary cell is referred to as an uplink primary component carrier (UL PCC).

The SCC (secondary component carrier) means a CC corresponding to the secondary cell. That is, the SCC is a CC assigned to the user equipment, which is not the PCC, and the SCC is an extended carrier for the user equipment to assign additional resources other than the PCC. The SCC may stay in activated state or deactivated state. The downlink component carrier corresponding to the secondary cell is referred to as a downlink secondary component carrier (DL SCC), and the uplink component carrier corresponding to the secondary cell is referred to as an uplink secondary component carrier (UL SCC).

The primary cell and the secondary cell have the following features.

First, the primary cell is used for transmission of a PUCCH. Second, the primary cell always remain activated while the secondary cell switches between activation/deactivation depending on particular conditions. Third, when the primary cell experiences radio link failure (hereinafter, "RLF"), the RRC reconnection is triggered. Fourth, the primary cell may be varied by a handover procedure that comes together with security key changing or an RACH (Random Access CHannel) procedure. Fifth, NAS (non-access stratum) information is received through the primary cell. Sixth, in the case of an FDD system, the primary cell is constituted of a pair of DL PCC and UL PCC. Seventh, a different component carrier may be set as the primary cell for each user equipment. Eighth, primary cells may be exchanged only by a handover, cell selection/cell reselection process. In adding a new secondary cell, RRC signaling may be used to transmit system information of the dedicated secondary cell.

As described above, the carrier aggregation system may support a plurality of component carriers (CCs), i.e., a plurality of serving cells, unlike the single carrier system.

Such carrier aggregation system may support cross-carrier scheduling. The cross-carrier scheduling is a scheduling method that allows for resource allocation of a PDSCH transmitted through other component carrier through a PDCCH transmitted through a particular component carrier and/or resource allocation of a PUSCH transmitted through other component carrier than the component carrier basically linked with the particular component carrier. That is, a PDCCH and a PDSCH may be transmitted through different downlink CCs, and a PUSCH may be transmitted through an uplink CC other than an uplink CC linked with a downlink CC through which a PDCCH including a UL grant is transmitted. As such, the cross-carrier scheduling-supportive system requires a carrier indicator indicating a DL CC/UL CC through which a PDSCH/PUSCH through which a PDCCH provides control information is transmitted. The field containing such carrier indicator is hereinafter referred to as a carrier indication field (CIF).

The carrier aggregation system supportive of cross-carrier scheduling may include a carrier indication field (CIF) in the conventional DCI (downlink control information) format. A cross-carrier scheduling-supportive system, e.g., an LTE-A system, adds a CIF to the existing DCI format (i.e., DCI format used in LTE), so that it may be extended with three bits, and it may reuse the existing coding scheme, resource allocation scheme (i.e., CCE-based resource mapping) for the PDCCH structure.

Meanwhile, a heterogeneous network in which a macrocell and a small-scale cell coexist has been discussed recently. Particularly, discussion is being conducted to detour traffic by dispersing terminals connected to a macro cell into a small-scale cell.

Figure 8:
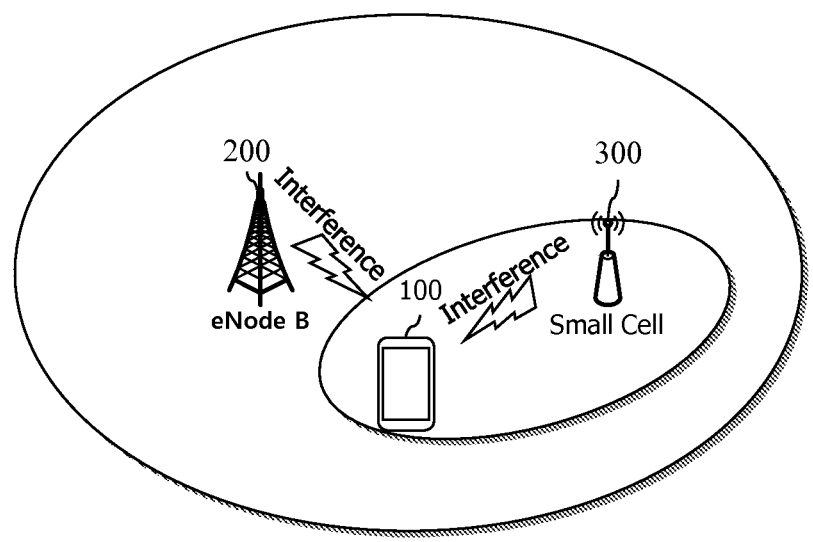
FIG. 8 illustrates a heterogeneous network which includes a macrocell and a small-scale cell.

FIG. 8 illustrates a heterogeneous network which includes a macrocell and a small-scale cell.

Next-generation communication standards including 3GPP LTE-A discuss a heterogeneous network in which small-scale cells with low power transmission capacity, for example, picocells, femtocells or microcells, overlap with each other in an established macrocell coverage.

Referring to FIG. 8, a macrocell may overlap with one or more microcells. A macrocell service is provided by a macro base station (Macro eNodeB or MeNB). In this specification, a macrocell and a macro base station may be used interchangeably. A terminal connected to a macrocell may be referred to as macro UE. Macro UE receives a downlink signal from the macro base station and transmits an uplink signal to the macro base station.

The small-scale cell may also be referred to as a femtocell, picocell or microcell. A small-scale cell service is provided by a pico base station (Pico eNodeB), a home base station (Home eNodeB or HeNB), a relay node (RN), or the like. For convenience, the pico base station (Pico eNodeB), the home base station (Home eNodeB or HeNB), and the relay node (RN) are collectively referred to as a home base station (HeNB). In this specification, a microcell and a home BS may be used interchangeably.

In the heterogeneous network, the macrocell and the small-scale cell overlap with each other, causing an inter-cell interference. As illustrated, when the terminal is located on a boundary between the macrocell and the small-scale cell, a downlink signal from the macrocell may act as interference. Likewise, a downlink from the small-scale cell may also act as interference.

Specifically, when the terminal 100 connected to the small-scale cell 200-1 is located on the boundary of the small-scale cell, the terminal 100 may be disconnected from the small-scale cell 200-1 due to interference by the macrocell 200, which means that coverage of the small-scale cell 200-1 becomes smaller than expected.

Alternatively, when the terminal 100 connected to the macrocell 200 is located in an area of the small-scale cell 200-1, the terminal 100 may be disconnected from the macrocell 200 due to interference by the small-scale cell 200-1, which means that a shadow area occurs in the macrocell 200.

A basic method for addressing the interference problem is using different frequencies in the heterogeneous network. However, since a frequency is a scarce and expensive resource, wireless service providers do not prefer a frequency division method.

Thus, the 3GPP employs a time division method to resolve the inter-cell interference problem.

Accordingly, the 3GPP are actively conducting studies on enhanced inter-cell interference coordination (eICIC) as an interference coordination method.

A time division method introduced to LTD-Release 10 has evolved as compared with a conventional frequency division method and thus is referred to as an enhanced ICIC. According to the time division method, an aggressor cell or primary cell, which is a cell causing interference, suspends data transmission in a particular subframe so that the terminal maintains connection to a victim cell or secondary cell, which is a cell undergoing the interference, in the subframe. That is, in the time division method, when heterogeneous cells coexist, one cell temporarily suspends transmitting a signal to a terminal having considerably high interference, thereby hardly sending an interference signal.

Meanwhile, the particular subframe in which data transmission is suspended is referred to as an almost blank subframe (ABS), in which no data is transmitted except for essential control data. The essential control data is, for example, a cell-specific reference signal (CRS). In current 3GPP LTE/LTE-A, CRSs are present in the $0^{th}$, $4^{th}$, $7^{th}$, and $11^{th}$ OFDM symbols in each subframe on the time axis. Thus, only CRSs are transmitted on the $0^{th}$, $4^{th}$, FDMA $7^{th}$, and $11^{th}$ OFDM symbols in an ABS.

In addition to eICIC, a method of adding an interference cancellation function to the UE 100 may be used to solve inter-cell interference. Hereinafter, a method of adding an interference cancellation function will be described.

Figure 9:
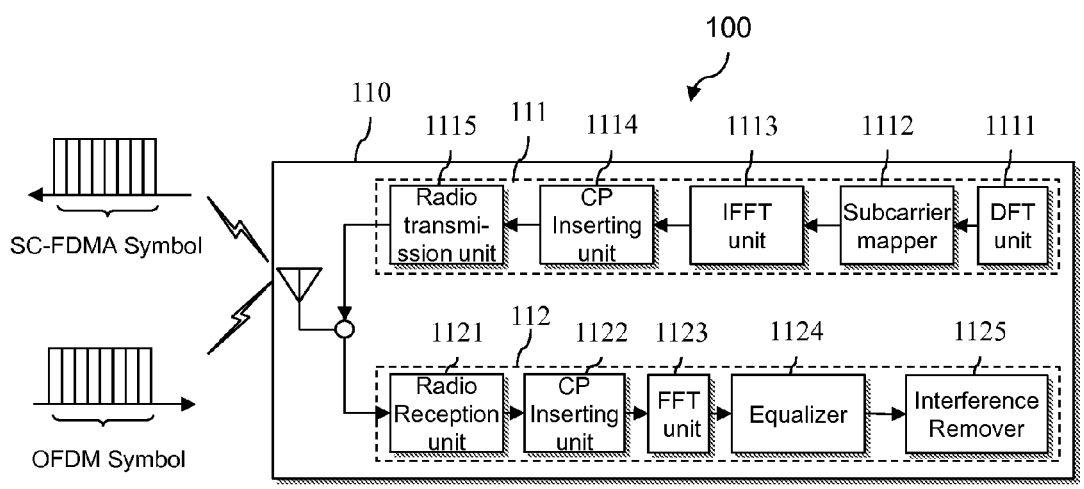
FIG. 9 is a block diagram illustrating the structure of UE according to one embodiment of the present specification.

FIG. 9 is a block diagram illustrating the structure of UE according to one embodiment of the present specification.

In LTE or LTE-A, OFDM is used for a downlink and SC-FDMA similar to OFDM is used for an uplink.

SC-FDMA may also be referred to as discrete Fourier transform (DFT)-spread OFDM (DFT-s OFDM). When SC- is used, non-linear distortion of a power amplifier may be avoided, thus improving transmission power efficiency in a power consumption-limited terminal. Accordingly, user throughput may be enhanced.

SC-FDMA is substantially similar to OFDM in that SC-FDMA transmits signals via separate subcarriers using a Fast Fourier transform (FFT) and inverse FFT (IFFT). A conventional OFDM transmitter has a problem that signals in respective subcarriers on the frequency axis are converted into signals on the time axis by IFFT. That is, IFFT is a scheme of performing the same operation in parallel, and thus peak-to-average power ratio (PAPR) increases. To prevent increase in PAPR, SC-FDMA performs IFFT after DFT spreading, unlike OFDM. That is, a transmission mode in which IFFT is performed after DFT spreading is defined as SC-FDMA. Further, SC-FDMA is also referred to as DFT spread OFDM (DFT-s-OFDM).

SC-FDMA secures robustness to a multipath channel due to a similar structure to OFDM and basically resolves a disadvantage of conventional OFDM that is increase in PAPR by IFFT, thereby allowing efficient use of a power amplifier.

Referring to FIG. 9, the UE 100 includes a radio frequency (RF) unit 110. The RF unit 110 includes a transmitter 111 and a receiver 112. The transmitter 111 includes a discrete Fourier transform (DFT) unit 1111, a subcarrier mapper 1112, an IFFT unit 1113, a cyclic prefix (CP) insertion unit 1114, and a wireless transmission unit 1115. The transmitter 111 of the RF unit 110 may further include, for example, a scramble unit, a modulation mapper, a layer mapper, and a layer permutator, which may be disposed before the DFT unit 1111. That is, as described above, to prevent increase in PAPR, the transmitter of the RF unit 110 subjects data to the DFT unit 1111 before mapping a signal to a subcarrier. The signal spread (or precoded) by the DFT unit 1111 is mapped onto a subcarrier by the subcarrier mapper 1112 and subjected to the IFFT unit 1113 into a signal on the time axis.

That is, in SC-FDMA, unlike OFDM, PAPR of a signal in the time domain obtained via the IFFT unit 1113 is not substantially increased by correlations between the DFT unit 1111, the subcarrier mapper 1112, and the IFFT unit 1113, thereby providing favorable transmission power efficiency. That is, in SC-FDMA, PAPR or cubic meter (CM) may be decreased.

The DFT unit 1111 performs DFT on input symbols to output complex-valued symbols. For example, when $N_{tx}$ symbols are input (here, $N_{tx}$ is a natural number), DFT has a size of $N_{tx}$. The DFT unit 1111 may be referred to as a transform precoder. The subcarrier mapper 1112 maps the complex-valued symbols onto respective subcarriers in the frequency domain. The complex-valued symbols may be mapped onto resource elements corresponding to resource blocks allocated for data transmission. The subcarrier mapper 1112 may be referred to as a resource element mapper. The IFFT unit 1113 performs IFFT on the input symbols to output a baseband signal for data as a signal in the time domain. The CP insertion unit 1114 copies latter part of the baseband signal for data and inserts the latter part in front of the baseband signal for data. CP insertion prevents inter-symbol interference (ISI) and inter-carrier interference (ICI), thereby maintaining orthogonality even in a multipath channel.

Meanwhile, the 3GPP is actively carrying out standardization of LTE-Advanced, evolving from LTE, for which clustered DFT-s-OFDM allowing non-contiguous resource allocation is adopted.

Clustered DFT-s-OFDM is a modification of existing SC-FDMA, which divides data symbols having been subjected to a precoder into a plurality of sub-blocks and separately mapping the sub-blocks in the frequency domain. An important feature of clustered DFT-s-OFDM allows frequency selective resource allocation to deal with a frequency selective fading environment in a flexible manner.

Here, clustered DFT-s-OFDM adopted as an uplink access mode for LTE-Advanced allows non-contiguous resource allocation, unlike SC-FDMA as an uplink access for LTE, and thus transmitted uplink data may be divided into a plurality of cluster units.

That is, the LTE system is configured to maintain a single carrier characteristic in an uplink, whereas the LTE-A system allows non-contiguous allocation of DFT-precoded data to the frequency axis or simultaneous transmissions of a PUSCH and PUCCH.

Meanwhile, the receiver 112 of the RF unit 110 includes a wireless reception unit 1121, a CP cancellation unit 1122, an FFT unit 1123, an equalizer unit 1124, and an interference cancellation unit 1125. The wireless reception unit 1121, the CP cancellation unit 1122, and the FFT unit 1123 of the receiver perform reverse functions of the wireless transmission unit 1115, the CP insertion unit 1114, and the IFFT unit 1113 of the transmitter 111.

The interference cancellation unit 1125 cancels or relieve interference included in a received signal.

The interference cancellation unit 1125 is added for dealing with an explosively increasing demand for radio data and for canceling interference as in FIG. 8.

Figure 10:
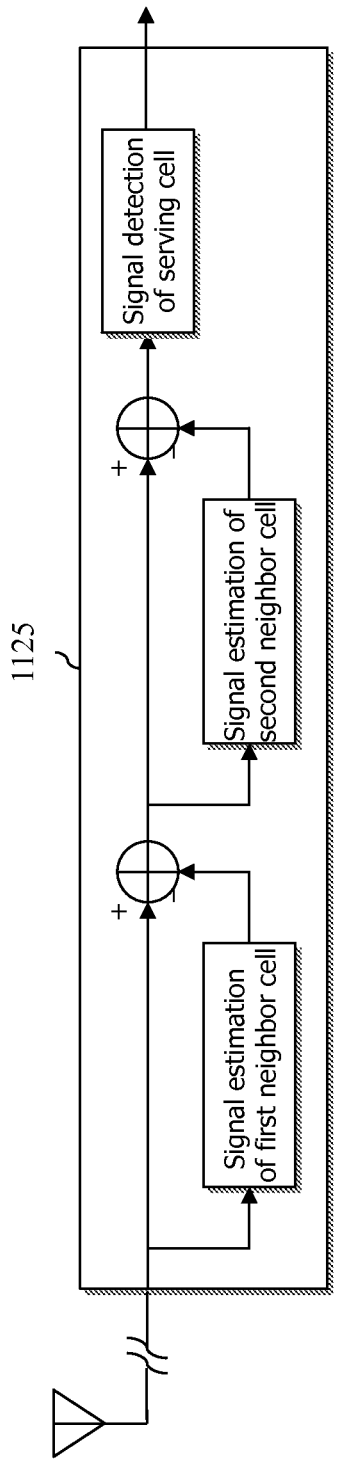
FIG. 10 is a block diagram illustrating operations of an interference cancellation unit of FIG. 9.

FIG. 10 is a block diagram illustrating operations of the interference cancellation unit shown in FIG. 9.

The receiver 112 additionally including the interference cancellation unit 1125, which is called an interference cancellation (IC) receiver or interference rejection combiner (IRC) receiver, is configured to subtract an interference signal from a received signal.

Here, complexity of the receiver additionally including the interference cancellation unit 1125 depends on a maximum number of cells as an interference cancellation target and kinds of signals to be cancelled. FIG. 10 illustrates operations of performing interference cancellation of up to two interference sources.

Interference cancellation target signals may be a cell-specific reference signal (CRS), a physical broadcasting channel (PBCH), a sync channel (SCH), a physical downlink shared channel (PDSCH), or the like.

The receiver additionally including the interference cancellation unit 1125, that is, the IC receiver or IRC receiver, may deal with a recent explosively increasing demand for radio data. In particular, the receiver additionally including the interference cancellation unit 1125 may achieve improvement in reception performance without any significant increase in complexity, securing a great performance gain particularly in an environment involving interference caused from neighbor base stations.

Meanwhile, in a wireless transmission system, a reception signal Y is generally expressed as follows with respect to a transmission signal X and a channel H.

$$Y = HX + N \quad \text{[Equation 5]}$$

The equalizer unit 1124 shown in FIG. 9 may perform equalization by multiplying the reception signal Y by an equalizer coefficient W, which may be expressed as follows.

$$\tilde{X} = WY \quad \text{[Equation 6]}$$

Here, the equalizer coefficient W, which is generally calculated according to a minimum mean squared error (MMSE) standard, may be obtained from an estimated channel H as follows.

$$W_{MMSE} = H^H(HH^H + \sigma_n I)^{-1} \quad \text{[Equation 7]}$$

Here, $\sigma_n$ is noise variance of the reception signal.

However, as IRC is added, Equation 7 may be replaced with Equation 8 below.

$$W_{IRC} = H^H(HH^H + R_{N+1})^{-1} \quad \text{[Equation 8]}$$

In Equation 8, $R_{N+1}$ is a covariance matrix of received interference. In the above two equations, $W_{MMSE}$ and $W_{IRC}$ are implemented by substantially the same process except that only methods for estimating interference of a reception signal are actually different.

However, LTE/LTE-A employs various transmission modes including Space Frequency Block Code (SFBC), Large Delay Cyclic Delay Diversity (CDD), and Closed Loop MIMO. Particularly, when Closed Loop MIMO is used, a PDSCH allocated to a single UE may use, in frequency, different types of precoding by frequency on the basis of at least 6 physical resource blocks (PRBs).

Accordingly, in LTE/LTE-A, a statistical characteristic of an interference signal transmitted from a neighbor base station may change at worst by each PRB in frequency and by 1-ms subframe in time.

Thus, interference estimation needs performing by RB in frequency and by subframe in time.

However, when an IRC reception algorithm is used, the covariance matrix of the received interference changes depending on the statistical characteristic of the transmitted signal including a transmission mode and precoding. Thus, when the IRC reception algorithm is used, interference estimation is allowed only for a signal in a single subframe in time.

Consequently, the IRC reception algorithm secures a relatively great performance gain in an environment mainly including interference components introduced from neighbor eNodeBs but is deteriorated in performance due to decrease in accuracy of interference estimation in an environment including white noise as compared with the conventional MMSE algorithm.

Accordingly, the present specification suggests that eNodeB conducts additional signaling to UE so that the UE identifies a statistical characteristic of an interference signal introduced into a cell in order to improve accuracy of an interference estimation technique used for IRC.

Figure 11A:
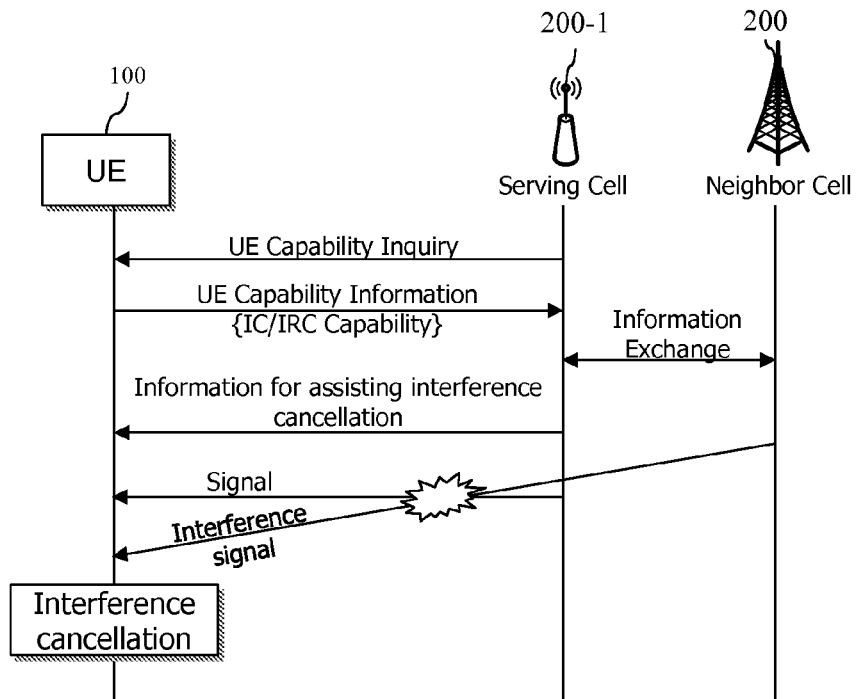
FIGS. 11a and 11b are flowcharts illustrating a method according to a first embodiment of the present specification.
Figure 11B:
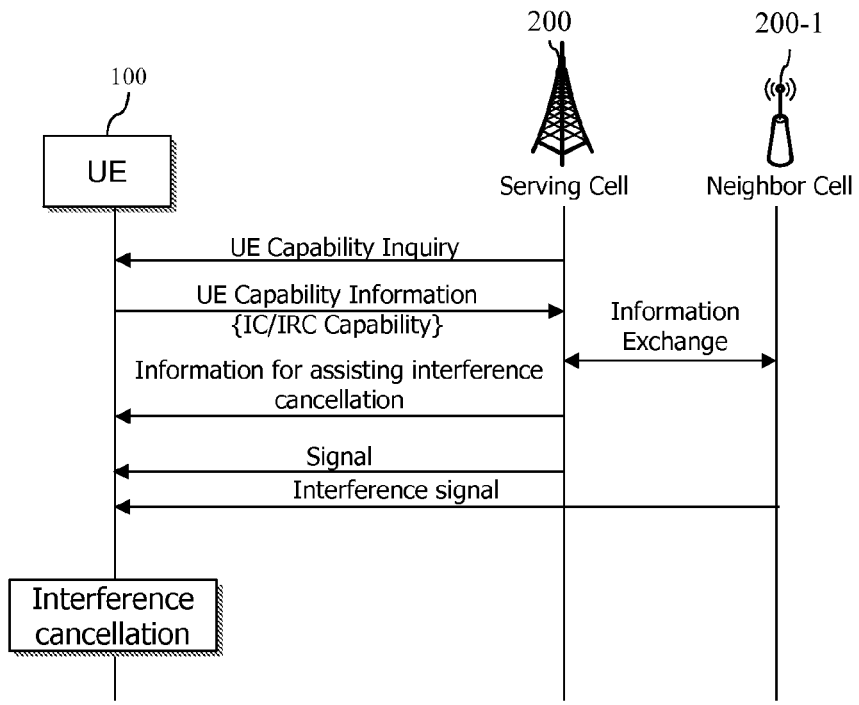

FIGS. 11a and 11b are flowcharts illustrating a method according to a first embodiment of the present specification.

FIG. 11a shows that a small-scale cell 200-1 is a serving cell and a macrocell 200 is a neighbor cell, and FIG. 11b shows that the macrocell 200 is a serving cell and the small-scale cell 200-1 is a neighbor cell.

Referring to FIGS. 11a and 11b, the serving cell exchange data with the neighbor cell through an X2 interface to verify a resource allocation state of the neighbor cell, identifies a characteristic of an interference signal introduced into the cell accordingly, and transmits interference estimation/cancellation assistance information to a UE 100. Here, the statistical characteristic refers to a coherence section of the interference signal in frequency and time.

The interference estimation/cancellation assistance information may be broadcasted through a broadcast channel, for example, a PBCH, to all UEs in the cell. Alternatively, the interference estimation/cancellation assistance information may be transmitted to a particular UE through RRC signaling. The particular UE may be RRC-connected.

The particular UE may be an IC/IRC-enable UE. For verification, the serving cell transmits a UE capability inquiry message to the UE 100 and receives UE capability data in response. The UE capability data includes IC/IRC capability data.

The interference estimation/cancellation assistance information transmitted by the serving cell to the UE 100 includes information for a frequency domain and information for a time domain. The information for the frequency domain may be designated by, for example, NoiseCoherenceF. The information for the time domain may be designated by, for example, NoiseCoherenceT.

The information for the frequency domain, NoiseCoherenceF, may include information on number of PRBs to be averaged in the frequency domain.

The information for the time domain, NoiseCoherenceT, may include informaton on number of radio frames/subframes belonging to a Moving Window section of the time domain or information on an alpha coefficient of a tracker used as an IIR filter.

For instance, NoiseCoherenceF may be expressed as a two-bit value as in Table 1. The two-bit value may represent 1, 2, 4, or 8. For example, a two-bit value of 00 may represent 1, 01 may represent 2, 10 may represent 4, and 11 may represent 8.

For example, NoiseCoherenceT may be expressed as an integer multiple of 10 ms which is length of a radio frame as in Table 1.

TABLE 1

| | |
|---|---|
| NoiseCoherenceF | 1, 2, 4, 8 (2 bits) |
| NoiseCoherenceT | 10 ms, 20 ms, 30 ms . . . |

When the IC/IRC-enabled UE 100 receives the interference estimation/cancellation assistance information, the UE 100 performs interference estimation, not by one PRB/one subframe as in the conventional method, but using all samples belonging to a wider section in frequency/time in view of the information for the frequency domain and the information for the time domain of the interference estimation/cancellation assistance information, thereby improving reliability.

That is, the equalizer unit 1124 of the receiver 112 of the UE 100 estimates interference using all samples belonging to the wider section in frequency/time, and accordingly the interference cancellation unit 1125 of the receiver 112 of the UE 100 may enhance reliability in interference cancellation.

Enhanced reliability may improve signal demodulation performance of the UE 100. Further, noise is reduced in a downlink channel to positively increase a channel quality indicator (CQI), allowing the UE 100 to request a higher modulation and coding scheme (MCS) from the serving cell when reporting channel state information (CSI). Accordingly, the foregoing method improves overall reception performance and transmission speed of a terminal.

Figure 12:
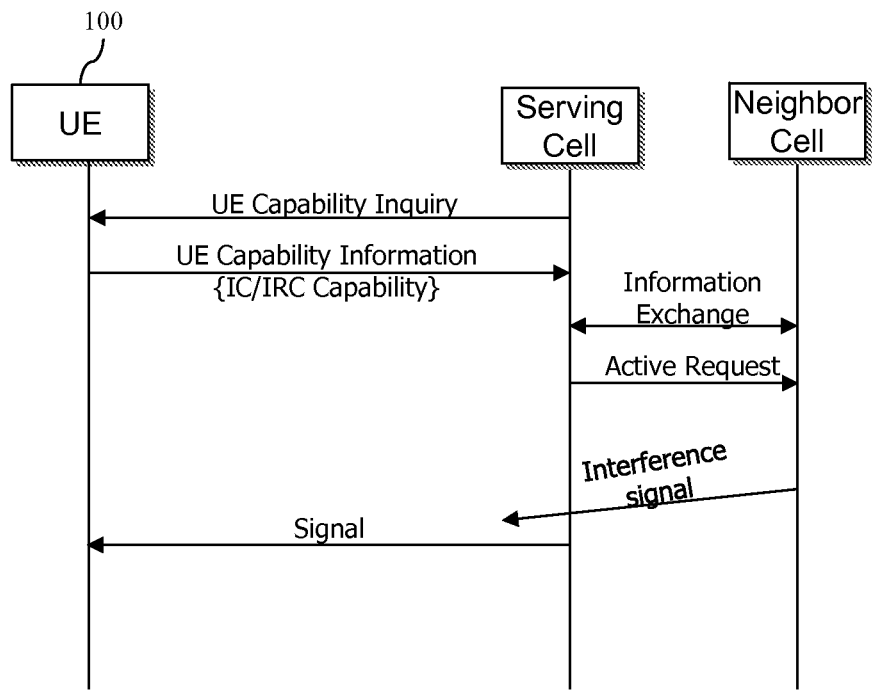
FIG. 12 is a flowchart illustrating a method according to a second embodiment of the present specification.

FIG. 12 is a flowchart illustrating a method according to a second embodiment of the present specification.

The second embodiment shown in FIG. 12 allows the serving cell not only to obtain resource allocation information from the neighbor cell as in the first embodiment shown in FIG. 11 but to actively request the neighbor cell to limit resource allocation. That is, the serving cell may actively transmit a request for limitation of a minimum resource allocation section in frequency and time to the neighbor cell. By the request, when a smaller amount of data than that for the minimum resource allocation section needs transmitting, the neighbor cell collects more data through buffering and transmits the collected data at once, or allocates adjacent frequency-time resource domains to a plurality of terminals requesting transmission of a small amount of data and applies the same transmission mode or precoding to the terminals, thereby maximally maintaining the statistically equivalent sections of the interference.

The embodiments illustrated above may be implemented by various instruments. For example, the embodiments of the present invention may be implemented by hardware, firmware, software, or combinations thereof, which will be described in detail with reference to FIG. 13.

Figure 13:
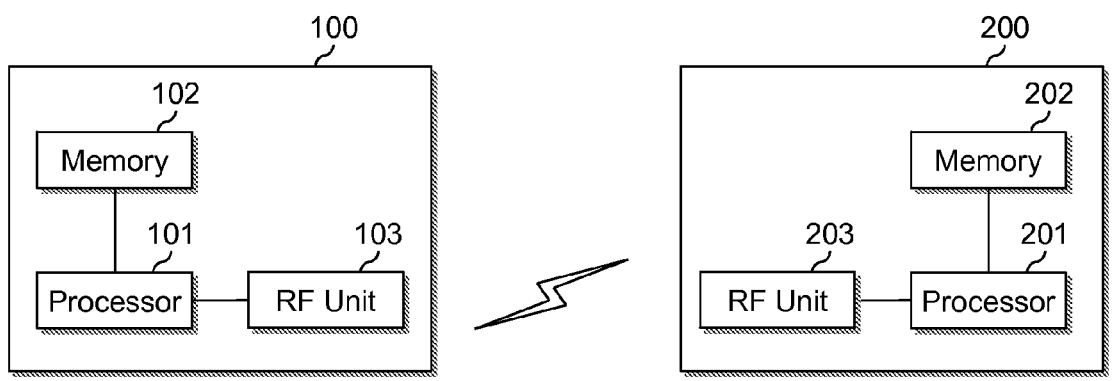
FIG. 13 is a block diagram illustrating a wireless communication system according to an embodiment of the present invention.

FIG. 13 is a block diagram illustrating a wireless communication system according to an embodiment of the present invention.

A BS 200 includes a processor 201, a memory 202, and an RF (radio frequency) unit 203. The memory 202 coupled to the processor 201 stores a variety of information for driving the processor 201. The RF unit 203 coupled to the processor 201 transmits and/or receives a radio signal. The processor 201 implements the proposed functions, procedure, and/or methods. In the aforementioned embodiment, an operation of the BS may be implemented by the processor 201.

A wireless device 100 includes a processor 101, a memory 102, and an RF unit 103. The memory 102 coupled to the processor 101 stores a variety of information for driving the processor 101. The RF unit 103 coupled to the processor 101 transmits and/or receives a radio signal. The processor 101 implements the proposed functions, procedure, and/or methods. In the aforementioned embodiment, an operation of the wireless device may be implemented by the processor 101.

The processor may include an application-specific integrated circuit (ASIC), a separate chipset, a logic circuit, and/or a data processing unit. The memory may include a read-only memory (ROM), a random access memory (RAM), a flash memory, a memory card, a storage medium, and/or other equivalent storage devices. The RF unit may include a baseband circuit for processing a radio signal. When the embodiment of the present invention is implemented in software, the aforementioned methods can be implemented with a module (i.e., process, function, etc.) for performing the aforementioned functions. The module may be stored in the memory and may be performed by the processor. The memory may be located inside or outside the processor, and may be coupled to the processor by using various well-known means.

Although the aforementioned exemplary system has been described on the basis of a flowchart in which steps or blocks are listed in sequence, the steps of the present invention are not limited to a certain order. Therefore, a certain step may be performed in a different step or in a different order or concurrently with respect to that described above. Further, it will be understood by those ordinary skilled in the art that the steps of the flowcharts are not exclusive. Rather, another step may be included therein or one or more steps may be deleted within the scope of the present invention.

What is claimed is:

1. An interference cancellation receiving method comprising:
    receiving interference estimation assistance information from a serving cell, the interference estimation assistance information including information for a time domain and information for a frequency domain, the information for the time domain indicating a period of a radio frame or subframe in the time domain in which coherence of an interference signal is maintained, and the information for the frequency domain indicating a period in the frequency domain in which the coherence of the interference signal is maintained;
    estimating an interference signal introduced from a neighbor cell using the information for the time domain and the information for the frequency domain of the interference estimation support information; and detecting a signal from the serving cell by cancelling the estimated interference signal.

2. The method of claim 1, wherein the interference estimation assistance information is generated by information acquired by the serving cell from the neighbor cell.

3. The method of claim 1, wherein the information for the time domain is expressed as an integer multiple of 10 ms which is length of the radio frame.

4. The method of claim 1, wherein the period in the frequency domain indicated by the information for the frequency domain is expressed as number of resource blocks (RBs).

5. The method of claim 4, wherein the number of RBs indicated by the information for the frequency domain is one of 1, 2, 4 and 8.

6. The method of claim 4, wherein the information for the frequency domain is expressed as a two-bit value, a two-bit value of 00 represents 1, a two-bit value of 01 represents 2, a two-bit value of 10 represents 4, and a two-bit value of 11 represents 8.

7. The method of claim 1, wherein the interference estimation assistance information is received through a broadcast channel or RRC signaling.

8. A terminal of a wireless communication system, the terminal comprising:

a wireless reception unit;

an interference estimation unit to control the wireless reception unit and to estimate an interference signal introduced from a neighbor cell using interference estimation assistance information received from a serving cell, the interference estimation assistance information comprising information for a time domain and information for a frequency domain, the information for the time domain indicating a period of a radio frame or subframe in the time domain in which coherence of an interference signal is maintained, and the information for the frequency domain indicating a period in the frequency domain in which the coherence of the interference signal is maintained; and an interference cancellation unit to detect a signal from the serving cell by cancelling the estimated interference signal.

9. The terminal of claim 8, wherein the information for the time domain is expressed as an integer multiple of 10 ms which is length of the radio frame.

10. The terminal of claim 8, wherein the period in the frequency domain indicated by the information for the frequency domain is expressed as number of resource blocks (RBs).

11. The terminal of claim 10, wherein the number of RBs indicated by the information for the frequency domain is one of 1, 2, 4 and 8.

12. The terminal of claim 10, wherein the information for the frequency domain is expressed as a two-bit value, a two-bit value of 00 represents 1, a two-bit value of 01 represents 2, a two-bit value of 10 represents 4, and a two-bit value of 11 represents 8.

* * * * *